Patented Nov. 22, 1949

2,489,181

UNITED STATES PATENT OFFICE 2,489,181

CONDENSATION OF ACRYLONITRILE AND DICYANDIAMIDE AND PRODUCT THEREOF

Ingenuin Hechenbleikner, Norwalk, Conn., assignor to American Cyanamid Company, New York, N. Y., a corporation of Maine No Drawing. Application June 18, 1946, Serial No. 677,531

3 Claims. (Cl. 260—2)

The present invention relates to synthetic resinous materials and their preparation and more particularly to the preparation of such materials by the condensation of dicyandiamide and acrylonitrile.

It is an object of the present invention to provide resinous syrups which may be used directly or modified by treatment with heat or various chemical agents to provide a wide variety of products.

It is another object of the present invention to provide a process whereby such resinous materials may be obtained.

These and other objects are attained by bringing about reaction between dicyandiamide and acrylonitrile. The condensation products thus obtained are viscous, resinous syrups suitable for use directly as in the impregnation of textiles or fabrics. They may also be applied to surfaces and heat treated or cured to result in hard, glossy protective coatings. They are likewise useful in the lamination of thin sheets. The viscous condensation products may also be treated with various chemical agents, such as polyalkylene polyamines, and various inert materials, such as fillers and molding powders, to provide a still greater variety of uses.

The reaction may be carried out with or without the use of a solvent although it is preferred to avoid the use of any solvent since no particular advantage is derived therefrom, the components of the reaction mixture being sufficiently compatible to permit the reaction to occur quite rapidly. This is particularly so when the solid dicyandiamide and the basic catalyst have been ground to a sufficient degree to permit their being finely suspended in the acrylonitrile. Any solvent which may be used in carrying out the reaction should be non-hydroxylic since the presence of an active hydroxyl group permits a sidereaction with the acrylonitrile. Such non-hydroxylic solvents suitable for use in carrying out the reaction are dioxane, trioxane, the diethers of ethylene glycol and diethylene glycol, and the like.

While the reaction will proceed without a catalyst present, the use of a strongly basic catalyst is highly desirable. Such catalysts are best employed in the proportion of substantially 1–10 mol per cent based on the dicyandiamide. While considerable variation in the amount of catalyst employed is permissible in the practice of the present invention, the use of appreciably smaller proportions of catalyst or no catalyst at all will be found to decrease the rate at which the condensation occurs to a point which is undesirably low, whereas unduly increasing the proportion of catalyst will render the rate of reaction undesirably high so that control of the properties of the product obtained thereby is rendered difficult. The strong bases suitable for use in catalyzing the reaction are those having basicities of the order of those of the alkaline earth metal and alkali metal oxides and hydroxides. While the less basic carbonates and bicarbonates are frequently suitable as basic catalysts in other reactions they are not sufficiently basic for use in the present reaction. In the claims, therefore, the term "strongly basic catalyst" is used to denote the above-mentioned alkali metal and alkaline earth metal oxides and hydroxides and other materials of like basicity such as the various quaternary ammonium hydroxides, guanidine, and the like. Examples of such quaternary ammonium hydroxides are tetramethyl-, tetraethyl-, tetrabutyl-, trimethylphenyl-, tributylbenzylammonium hydroxide, methyl-, ethyl-, propyl-, octyl-, decyl-, phenyl-, benzylpyridinium hydroxide and the like.

The temperature at which the reaction of the present invention may be carried out varies over a wide range, although it is preferred to employ a range of substantially 75°–125° C. Below about 75° C. the rate of reaction is too low from a practical standpoint whereas above 125° C. difficulty is had in controlling the reaction and the properties of the product obtained.

The period of reaction may be varied within wide limits although experience has shown that in order to obtain a reasonably viscous polymeride the reaction should be allowed to proceed for at least 1 hour. On the other hand, a period of reaction as long as 24 hours will still provide a flowable product although heating for 36 hours will provide a semi-solid condensation product which cannot be poured from the reaction flask.

The ratio with which the acrylonitrile-dicyandiamide adducts can be formed varies over a wide range. However, it is preferred that they be combined in a ratio of one mol of dicyandiamide to from 1 to 7 mols of acrylonitrile since within this range of combination the adducts have been found to have the most advantageous properties.

The condensation products of the present invention have a very good capacity for being hardened by heat, being infusible at high temperatures. Heat treatment of a thin coating of the resinous syrup provides a hard glossy finish which is unaffected by water or alkaline solutions. Furthermore, products obtained from the resinous material of the present invention are substantially stable to light and while not entirely free from intrinsic color are generally only a light amber. The condensation products of the present invention are, therefore, suitable for many purposes. They may be used as masses to be cast or pressed, as binding agents for the production of molded or laminated products, as adhesives, as textile treating agents, and when modified by treatment with suitable chemical agents such as a polyalkylene polyamine they are useful as anion exchange resins.

Example 1

A mixture of 1 mol of dicyandiamide, 2 mols of acrylonitrile and 0.025 mol of sodium hydroxide was heated to reflux at 75° C., the temperature rising to 105° C. in 3 hours whereupon a dark yellow color developed. 174 g. of viscous product were obtained and after heating in a drying oven for 24 hours the products weighed 171 g.

Example 2

A mixture of 1 mol of dicyandiamide, 4 mols of acrylonitrile and 0.05 mol of sodium hydroxide was heated to reflux at 74° C. rising to 77° C. After 6 hours a somewhat cloudy viscous liquid was obtained which weighed 295 g., losing only 5 g. on heating at 100° C. for overnight.

Example 3

A mixture of 2 mols of dicyandiamide, 12 mols of acrylonitrile and 0.05 mol of potassium hydroxide was heated to reflux for 36 hours. The dark colored resin was stirred on a steam bath and the excess acrylonitrile removed under vacuum to obtain 140 cc. of the nitrile. 590 g. of semi-solid product were obtained which could not be poured from the reaction flask.

Example 4

One half mol of dicyandiamide was ground and suspended in 3.6 mols of acrylonitrile, 0.05 mol of calcium hydroxide added and the mixture was heated under reflux for 2 hours, the temperature at which refluxing began being 76° C., the reflux temperature gradually rising to 81° C. By this time all of the dicyandiamide had disappeared. The viscous liquid was filtered with filter aid using suction. The viscous syrup was steam distilled to remove excess acrylonitrile although only a very small amount of such nitrile was obtained, showing that substantially all of the nitrile had combined with the dicyandiamide. This viscous syrup is useful as such in the treatment of textiles to impart water repellancy, and as a laminating resin although the rather high curing temperature will limit its application to the more heat resistant materials unless a suitable catalyst such as ammonium chloride or ammonium phosphate is employed.

The viscous condensation product may be employed in the preparation of surface coatings by applying it to the surface and heating at 175° C. for 1 hour. This provides a hard glossy surface which is unaffected by water or alkaline solutions. While lower temperatures may be employed in curing the thin layers of condensation product used in preparing protective coatings the use of such temperatures requires considerably longer periods for such curing. Higher temperatures may be employed but their use tends to limit the materials to which such coatings may be applied.

Example 5

A mol of dicyandiamide was ground to a fine powder and added to 7.6 mols of acrylonitrile with 0.10 mol of calcium oxide and the mixture heated on a water bath. Reflux began at 74° C., and after heating for 4 hours the temperature of reflux had risen to 84° C. by which time the dicyandiamide had disappeared. 270 g. of viscous product were placed in a drying oven at 100° C. for 12 hours whereupon it lost 60 g. in weight, which was presumably uncombined acrylonitrile. The remainder was diluted with water and steam distilled to obtain 70 cc. of acrylonitrile and 174 g. of viscous condensation product. From this it was apparent that the dicyandiamide and the acrylonitrile had combined in the ratio of about 1 mol:5.5 mols.

The syrup may be admixed with suitable fillers such as cellulose, wood flour, glass fiber and the like and thereafter used in the preparation of molded articles prepared by the application of heat and pressure.

Example 6

A mixture of 0.5 mol of dicyandiamide, 5 mols of acrylonitrile and 0.025 mol of sodium hydroxide was heated at reflux for 24 hours, the final refluxing temperature being 80° C. After refluxing, the product was spread upon a stainless steel tray for drying at 100° C. The weight before drying was 293 g. and after drying it was 213 g., showing the loss of 80 g. of acrylonitrile and combination in the ratio of 1 mol of dicyandiamide to about 7 mols of acrylonitrile.

The acrylonitrile-dicyandiamide adduct was mixed with 1 mol of tetraethylenepentamine, and the resulting paste was cured for 4 hours at 100° C. in a steam heated oven. During this low temperature cure considerable ammonia was evolved from the paste, and a resinous product resulted. This product was further cured by heating it 17 hours at 160° C. During the resin formation 1.7 mols of ammonia was evolved per mol of tetraethylenepentamine and 3.6 mols of ammonia per mol of acrylonitrile-dicyandiamide adduct.

The final product was ground, screened to 20–40 mesh material and evaluated for ion exchange activity. The resin had a capacity of 8.8 kgr. of $CaCO_3$/cu. ft. of resin and a density of 6.3 lbs./cu. ft.

Example 7

One half mol dicyandiamide was added to 1 mol of tetraethylenepentamine. The slurry was heated and 4.0 mols of acrylonitrile were added thereto over a 5–15 minute period. During the addition mild refluxing occurred and considerable ammonia was evolved. After the addition the resulting syrup was heated by means of steam for 30 minutes, after which the syrup was cured by heating for about 17 hours at 150° C.

The brittle, porous, orange to red color resin had a capacity of 10.6 kgr. of $CaCO_3$/cu. ft. of resin and a density of 12.2 lbs./cu. ft.

While the invention has been described with particular reference to specific embodiments, it is to be understood that it is not to be limited thereto but is to be construed broadly and restricted solely by the scope of the appended claims.

What is claimed is:

1. A process of preparing a condensation product which comprises reacting dicyandiamide and acrylonitrile in the proportion of 1 mol of dicyandiamide to substantially 1-7 mols of acrylonitrile in the presence of substantially 1-10 mol per cent of a strongly basic catalyst selected from the group consisting of a quaternary ammonium hydroxide, an alkali metal oxide, an alkali metal hydroxide, an alkaline earth metal oxide, and an alkaline earth metal hydroxide on the basis of the dicyandiamide.

2. A process of preparing a condensation product which comprises reacting dicyandiamide and acrylonitrile in the proportion of 1 mol of dicyandiamide to substantially 1-7 mols of acrylonitrile in the presence of substantially 1-10 mol per cent of a strongly basic catalyst selected from the group consisting of a quaternary ammonium hydroxide, an alkali metal oxide, an alkali metal hydroxide, an alkaline earth metal oxide, and an alkaline earth metal hydroxide on the basis of the dicyandiamide at a temperature of substantially 75-125° C. for a period of at least 1 hour.

3. The condensation product of dicyandiamide and acrylonitrile prepared by reacting dicyandiamide and acrylonitrile in the proportion of 1 mol of dicyandiamide to substantially 1-7 mols of acrylonitrile in the presence of substantially 1-10 mol per cent of a strongly basic catalyst selected from the group consisting of a quaternary ammonium hydroxide, an alkali metal hydroxide, an alkali metal oxide, an alkaline earth metal oxide, an alkaline earth metal hydroxide or a mixture thereof on the basis of the dicyandiamide.

INGENUIN HECHENBLEIKNER.

REFERENCES CITED

The following references are of record in the file of this patent:

UNITED STATES PATENTS

| Number | Name | Date |
| --- | --- | --- |
| 2,380,712 | Stewart | July 31, 1945 |